United States Patent [19]
Schaedler et al.

[11] Patent Number: 6,016,886
[45] Date of Patent: Jan. 25, 2000

[54] POWER ASSIST STEERING SYSTEM

[75] Inventors: Axel Schaedler, North Royalton; John Robertson, Berea, both of Ohio

[73] Assignee: MTD Products Inc., Cleveland, Ohio

[21] Appl. No.: 08/936,372

[22] Filed: Sep. 24, 1997

Related U.S. Application Data

[60] Provisional application No. 60/053,723, Jul. 25, 1997.

[51] Int. Cl.[7] ........................................... B62D 5/06
[52] U.S. Cl. ............................ 180/431; 180/417; 180/432
[58] Field of Search ...................... 180/400, 417, 180/432, 431, 439; 280/93.502, 93.507, 93.513

[56] References Cited

U.S. PATENT DOCUMENTS

| | | | |
|---|---|---|---|
| Re. 34,057 | 9/1992 | Middlesworth | 180/6.2 |
| 2,053,272 | 9/1936 | Eaton | 180/431 |
| 2,624,533 | 1/1953 | Brader | 244/50 |
| 2,748,881 | 6/1956 | Holley | 180/421 |
| 2,987,135 | 6/1961 | Harvey | 180/421 |
| 3,029,891 | 4/1962 | Price | 180/271 |
| 3,057,429 | 10/1962 | Quayle | 180/431 |
| 4,441,735 | 4/1984 | Hutchison | 280/771 |
| 5,113,641 | 5/1992 | Cook et al. | 56/10.5 |
| 5,174,595 | 12/1992 | Snipes | 180/411 |
| 5,321,938 | 6/1994 | LeBlanc | 56/6 |
| 5,529,135 | 6/1996 | Wenzel et al. | 180/6.24 |
| 5,788,276 | 8/1998 | Yamanaka | 280/771 |

*Primary Examiner*—J. J. Swann
*Assistant Examiner*—Andrew J. Ririe
*Attorney, Agent, or Firm*—Emerson & Associates; Roger D. Emerson; Timothy D. Bennett

[57] ABSTRACT

A power assist steering system is provided for use on a vehicle that has a steering implement and a steering mechanism operatively connected to a first wheel. The power assist steering system includes first and second vacuum actuators, a vacuum for providing a vacuum to the first and second vacuum actuators, an actuator for selectively activating the first and second vacuum actuators and a power assist for assisting the steering mechanism in turning the first wheel in first and second directions.

9 Claims, 6 Drawing Sheets

POWER ASSIST STEERING SYSTEM

The applicant for this non-provisional application hereby claims priority based on the prior provisional application titled VACUUM ACTUATOR CONTROL MECHANISM, filed on Jul. 25, 1997 and given the provisional application Sir. No. 60/053,723.

BACKGROUND OF THE INVENTION

1. Field of Invention

This invention pertains to the art of methods and apparatuses for steering vehicles, and more specifically to methods and apparatuses for using a vacuum actuator to power assist the steering mechanism of a vehicle.

2. Description of the Related Art

It is well known to provide steering mechanisms for steering a vehicle. Typically, a steering mechanism uses a steering implement (such as a steering wheel) that adjusts a series of mechanical linkages so that the wheels of the vehicle can be turned. Such a steering mechanism can be difficult for the operator to operate due to the forces required to move the various mechanical linkages. To overcome this problem, it is known in the art to provide power steering systems which diminish the effort required by the operator in steering the vehicle. However, such power steering systems typically include hydraulic systems or other similarly complex systems. Therefore, power steering systems known in the art, though effective, are difficult to construct, add considerable weight to the vehicle and are expensive.

The present invention provides methods and apparatuses for a power assist steering system that utilizes a vacuum actuator and can be used to assist the steering mechanism of a vehicle. The difficulties inherit in the art are therefore overcome in a way that is simple and efficient while providing better and more advantageous results.

SUMMARY OF THE INVENTION

According to one aspect of the present invention, there is provided a power assist steering system for use on a vehicle. The power assist steering system includes a first vacuum actuator, vacuum means for providing a vacuum to the first vacuum actuator, activating means for selectively activating the first vacuum actuator and power assist means for assisting a steering mechanism on the vehicle.

According to another aspect of the present invention, the power assist steering system also includes a second vacuum actuator. The first vacuum actuator is used with the power assist means to turn the wheels of the vehicle in a first direction while the second vacuum actuator is used with the power assist means in turning the wheels of the vehicle in a second direction.

According to another aspect of the present invention, there is provided a method for steering a vehicle. The method includes the steps of adjusting a steering implement, switching a switching means, initiating a first vacuum actuator and turning the wheels.

One advantage of the present invention is that it is easy to manufacture and can be made economically.

Another advantage of the present invention is that it is formed of components that are light in weight.

Another advantage of the present invention is that an intake manifold, typically used in internal combustion engines, can be used as a vacuum source.

Another advantage of the invention is that a vehicle can be assisted in its steering without the need for a hydraulic system or other such complex steering system.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
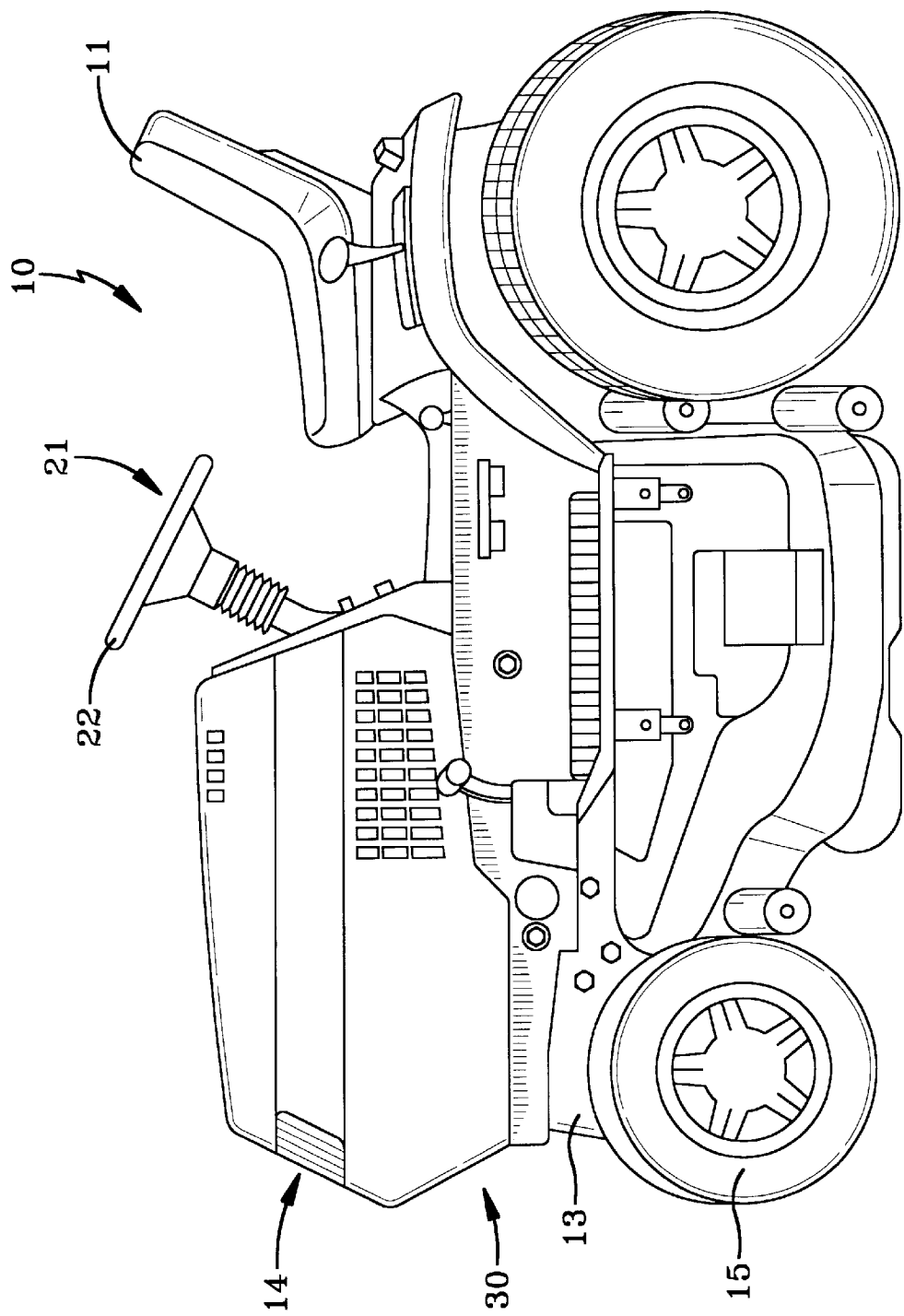
FIG. 1 is a perspective side view of a typical riding lawn mower that is equipped with the power assist steering system of the present invention.
Figure 2:
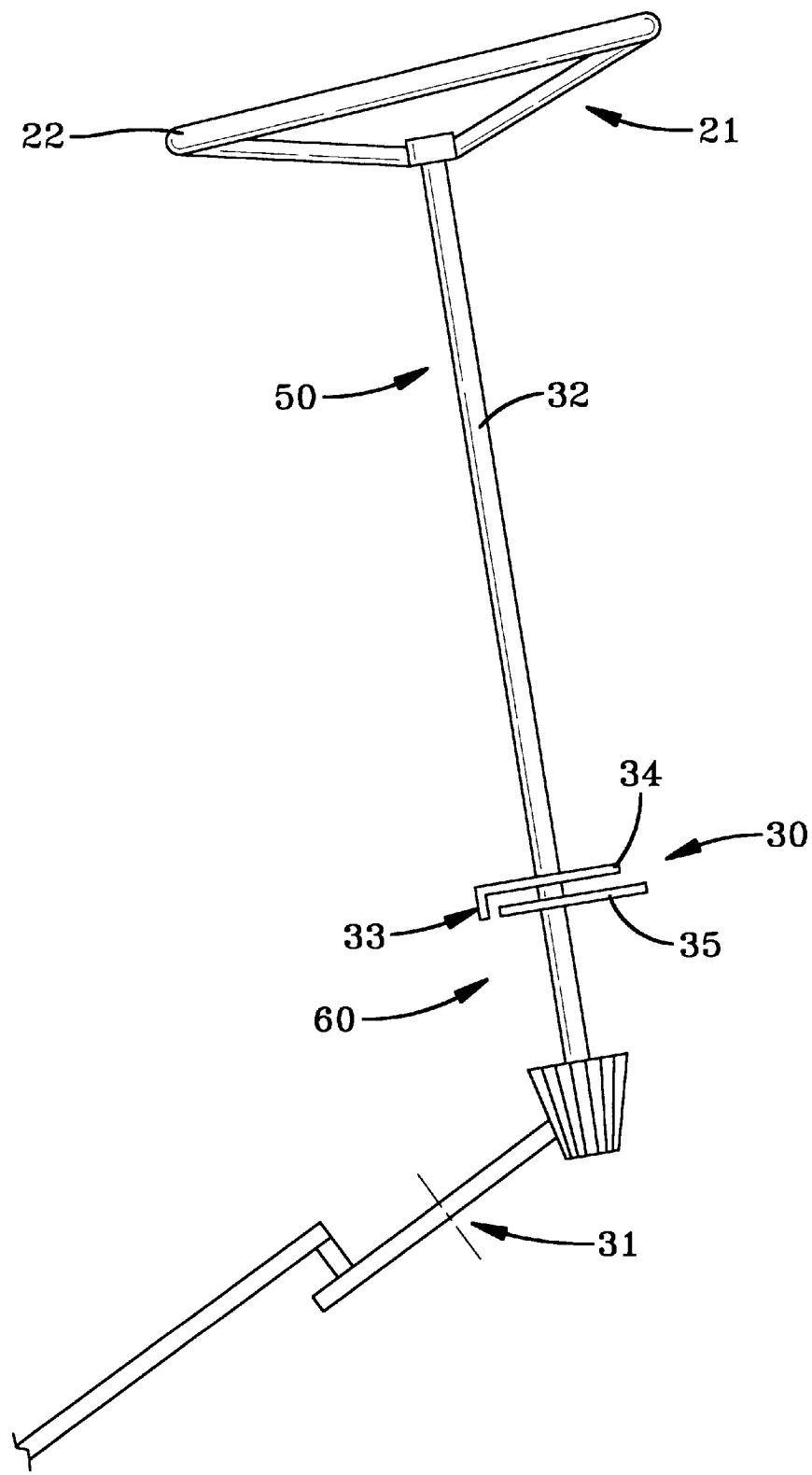
FIG. 2 is a schematic side view showing the power assist steering system as it operatively connects a steering implement to a steering mechanism.

Referring now to the drawings wherein the showings are for purposes of illustrating a preferred embodiment of the invention only and not for purposes of limiting the same, FIG. 1 shows a riding mower 10 which is equipped with a power assist steering system 30 in accordance with this invention. This preferred embodiment is directed to a riding lawn mower but the invention is applicable to other vehicles, and other applications as well. The riding mower 10 includes an operator seat 11, a body 13, a steering implement 21 used to turn first and second wheels 15, 16 (the second wheel 16 can be seen in FIGS. 3 and 4) and an engine 14. The engine 14 can be of any type currently used in the art but preferably it includes a vacuum means 24 such as an intake manifold 25 as shown in FIG. 4. It should be noted that other vacuum means can also be used for this invention.

Referring now FIGS. 1–4, the power assist steering system 30 of this invention includes first and second vacuum actuators 40, 41, the vacuum means 24 for providing a vacuum to the first and second vacuum actuators 40, 41, activating means 50 for selectively activating the first and second vacuum actuators 40, 41, and power assist means 60 for use in turning the first and second wheels 15, 16.

With reference now to FIGS. 3 and 5–8, any vacuum actuator chosen with sound engineering judgement is useful for this invention. The preferred vacuum actuator 40 has a connection port 47 for operative connection to the vacuum means 24 shown in FIG. 4. In the preferred embodiment, the connection port 47 is connected to a first vacuum line 45. The first vacuum actuator 40 also has a first side 48 that moves in inward direction 82 as a vacuum is established inside the first vacuum actuator 40. When a vacuum within the first vacuum actuator 40 is removed, the first side 48 moves in outward direction 83. Outward direction 83 is shown as first direction 17 in FIG. 3 and inward direction 82 is shown as second direction 18 in FIG. 3. Therefore the first vacuum actuator 40 can be initiated by either establishing a vacuum within or removing a vacuum from the first vacuum actuator 40. The first side 48 of the first vacuum actuator 40 will move accordingly. Such movement of the first side 48 of the first vacuum actuator 40 can be used with the power assist means 60 as will be discussed further below. It should be understood that the second vacuum actuator 41 having a first side 49 is similarly constructed and operated.

Figure 8:
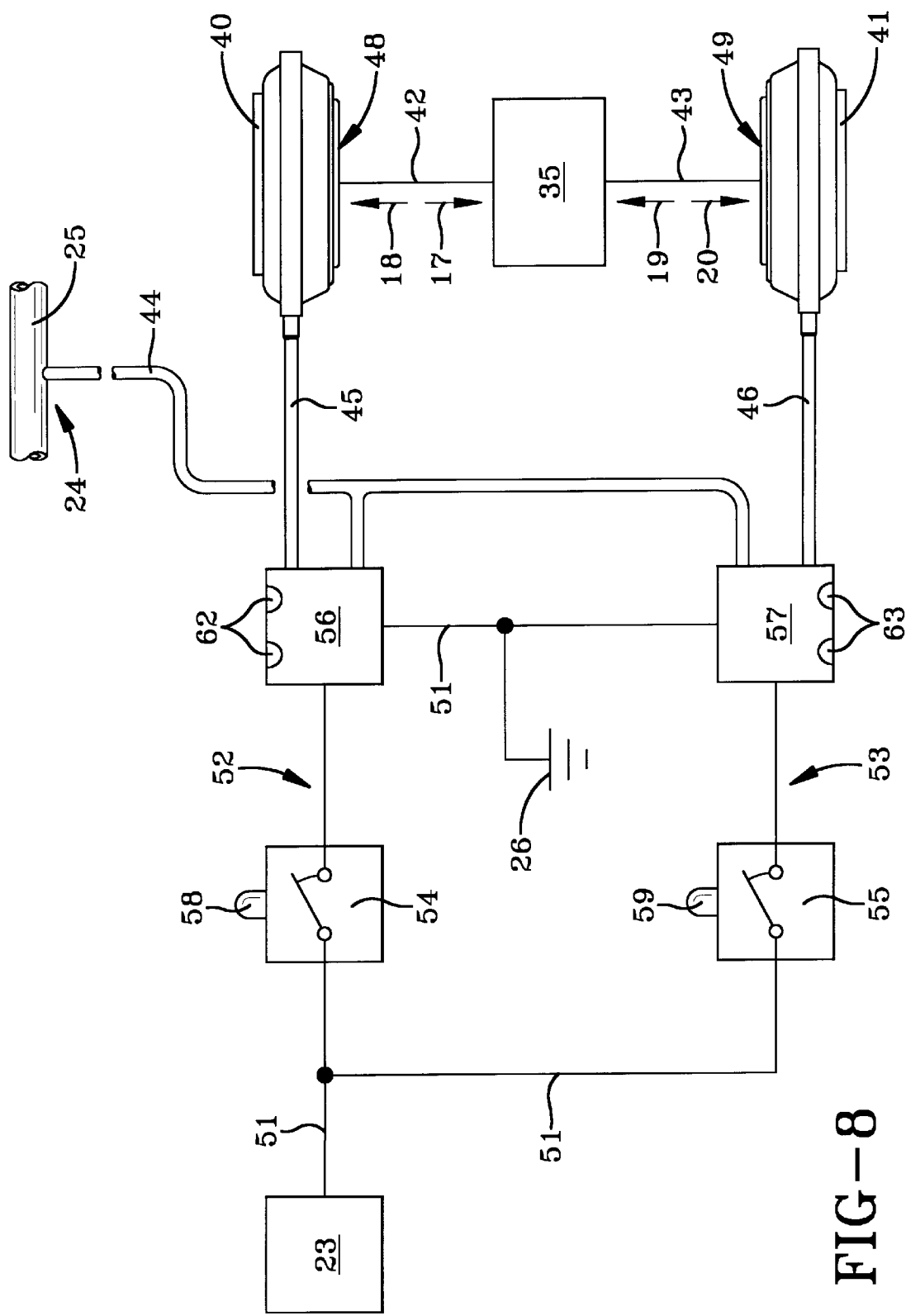
FIG. 8 is a schematic representation using an alternate switching means and showing how first and second electric switches are used to activate first and second solenoid valves thereby initiating the first and second vacuum actuators.

With reference now to FIGS. 1, 4 and 8, in the preferred embodiment the engine 14 of the riding mower 10 has an intake manifold 25 as is commonly known in the art. The intake manifold 25 is preferably used as the vacuum means 24 for providing a vacuum to the first and second vacuum actuators 40,41. In this way, as long as the engine 14 of the riding mower 10 is running, there is a vacuum means 24 available for the power assist steering system 30. It should be noted that other vacuum means, such as a vacuum pump (not shown), can be used with this invention. A vacuum source line 44 communicates the intake manifold 25 to a first and second switching means 52, 53 that will be discussed further below.

With reference now to FIGS. 1–4, the power assist steering system 30 of this invention receives operator input from the steering implement 21 and transmits that input through a steering mechanism 31 to the first and second wheels 15, 16. In this embodiment the steering implement 21 is a steering wheel 22. This invention is also operable with other types of steering implements 21 such as the use of levers (not shown). The steering mechanism 31 can be of any type currently known in the art. The steering wheel 22 of this embodiment is operatively connected to a steering rod 32 for operative connection to the power assist steering system 30.

With continuing reference to FIGS. 1–4, the activating means 50 used to selectively activate the first and second vacuum actuators 40, 41 can also be of any type chosen with sound engineering judgement. In this preferred embodiment the activating means 50 includes the first and second switching means 52, 53 which are used to initiate the first and second vacuum actuators 40,41. The activating means 50 also includes the vacuum source line 44 that communicates a vacuum from the intake manifold 25 to the first and second switching means 52, 53. The first vacuum line 45 communicates the first switching means 52 to the first vacuum actuator 40 and a second vacuum line 46 communicates the second switching means 53 to the second vacuum actuator 41. The activating means 50 also includes a trigger segment 34 that is fixedly connected to the steering rod 32 whereby it can be selectively rotated by the steering implement 21. The trigger segment 34 has an extension 33 fixedly attached thereon. Preferably the extension 33 extends transversely across the trigger segment 34 and has first and second ends 65, 66. The extension 33 of the trigger segment 34 is used in switching the first and second switching means 52, 53 as will be discussed further below.

With reference now to FIGS. 4 and 8, the first and second switching means 52, 53 can be of any type chosen with sound engineering judgement. Two alternative embodiments of the first and second switching means 52, 53 are herein disclosed. The first and second switching means 52, 53 shown in FIG. 4, include first and second air valve 38, 39 having tips 27, 28 and holes 84, 85 that permit ambient air to enter the system when the first and second air valves 38, 39 are closed. When the tips 27, 28 are pressed by the extension 33 of the trigger segment 34, the first and second air valves 38, 39 can thus be opened and closed.

Alternately, with reference now to FIG. 8, the first and second switching means 52, 53 of this embodiment includes first and second electric switches 54, 55 having tips 58, 59 and first and second solenoid valves 56, 57. The first and second electric switches 54, 55 are positioned near the first and second ends 65, 66 of the extension 33 as were the first and second air valves 40, 41 shown in FIG. 4. The first and second solenoid valves 56, 57, as is commonly known in the art, activate, i.e., open and close, in response to an electric signal. The first and second solenoid valves 56, 57 have holes 62, 63 that permit ambient air to enter the system when the first and second solenoid valves 56, 57 are closed. This embodiment includes a power source 23 that is preferably operatively associated with the engine 14 of the riding mower 10, shown in FIG. 1. The first and second electric switches 54, 55, the first and second solenoid valves 56, 57 and a ground 26 are connected electrically by wiring 51, as shown in FIG. 8. When the tip 58 of the first electric switch 54 is pressed by the first end 65 of the extension 33, the first electric switch 54 can be opened and closed. When the first electric switch 54 is closed, an electric signal proceeds from the power source 23 through the first electric switch 54 and to the first solenoid valve 56. This activates the first solenoid valve 56. The second electric switch 55 and the second solenoid valve 57 are similarly operated when the second end 66 of the extension 33 presses the tip 59. In this way, the second solenoid valve 57 is activated.

With reference now to FIGS. 1–4, the power assist means 60 for assisting the steering mechanism 31 in turning the first and second wheels 15, 16 will now be further disclosed. The power assist means 60 includes a valve plate 35 that is used to support the first and second switching means 52, 53. Attached to a first side 68 of the valve plate 35 is a first stop bar 36. Similarly, attached to a second side 69 of the valve plate 35 is a second stop bar 37. The first and second stop bars 36, 37 are used to engage the first and second ends 65, 66 of the extension 33 for two reasons. First, the first and second stop bars 36, 37 prevent the extensions 33 from moving toward the first and second switching means 52, 53 beyond what is necessary to switch the first and second switching means 52, 53. This protects the first and second switching means 52, 53. Second, the first and second stop bars 36, 37, when contacted by the first and second ends 65, 66 of the extension 33, transmit the operator input from the trigger segment 34 to the valve plate 35. Thus, if the power assist steering system 30 was inoperative for any reason, such as if the vacuum means 24 was stopped due to the engine 14 shutting off, the riding mower 10 could still be turned though it would require additional effort from the operator.

Figure 3:
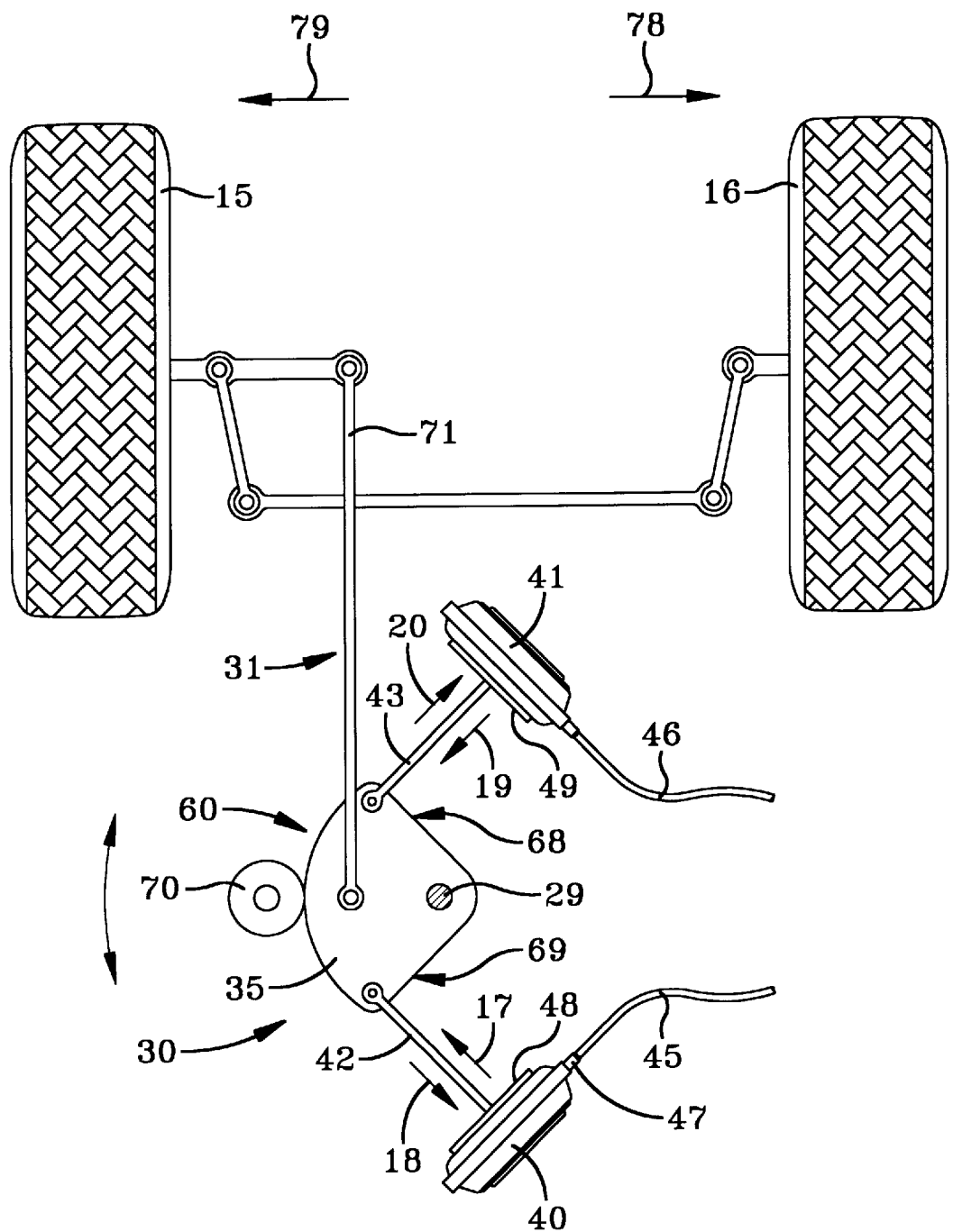
FIG. 3 is a schematic representation showing how the first and second vacuum actuators are operatively connected to the steering mechanism of a vehicle.
Figure 4:
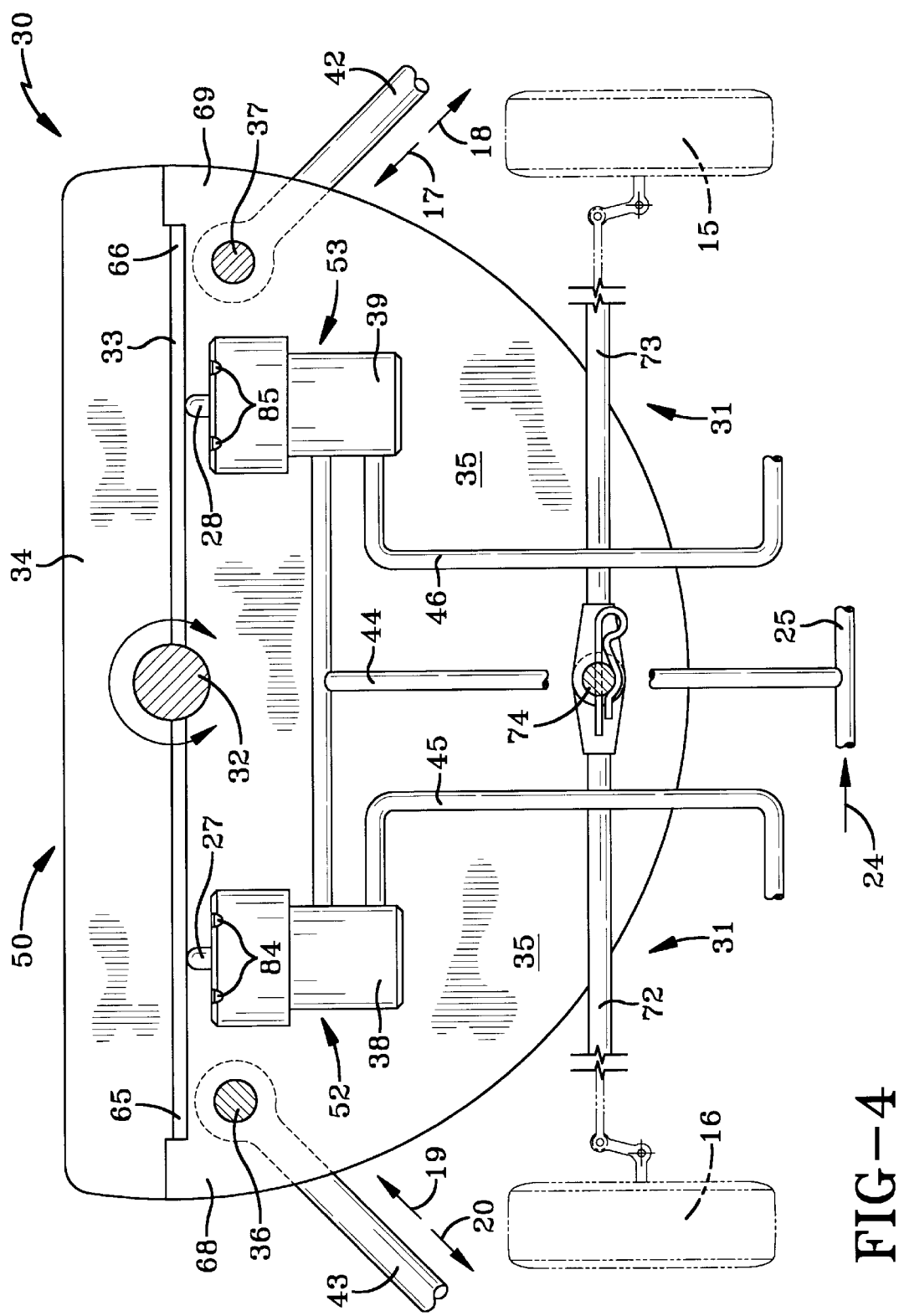
FIG. 4 is a schematic bottom view showing how the extension of the trigger segment is used to switch the first and second switching means.
Figure 5:
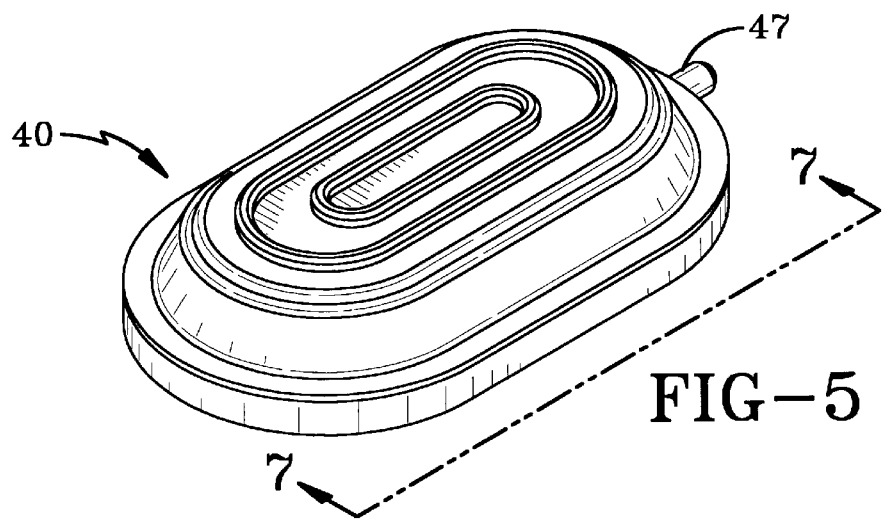
FIG. 5 is a perspective top view of the preferred vacuum actuator of the present invention.
Figure 6:
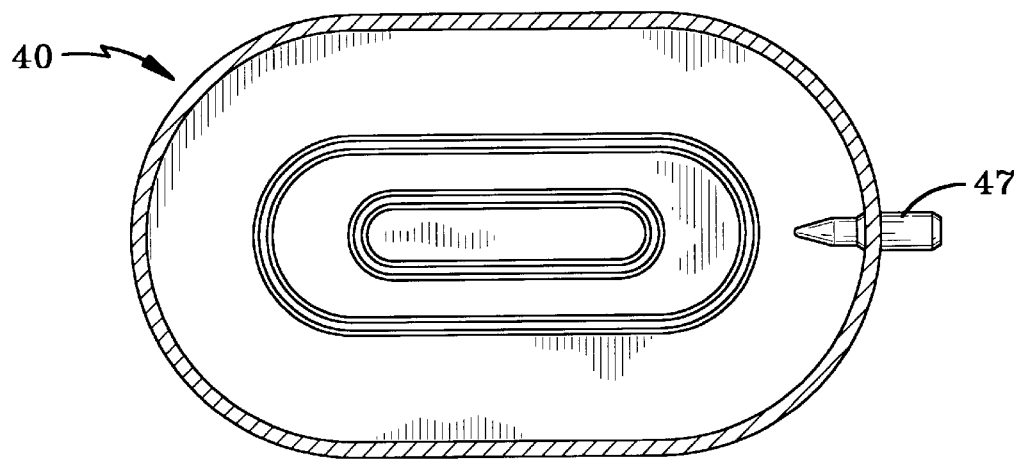
FIG. 6 is a sectional view of the vacuum actuator of FIG. 5 taken along the line 6—6 of FIG. 7 showing the connection port.

With continuing reference to FIGS. 1–4, the power assist means 60 also includes a first connector link 42 that is pivotably connected to the first side 48 of the first vacuum actuator 40 and to the second side 69 of the valve plate 35. Simarly, a second connector link 43 is operatively connected to the first side 49 of the second vacuum actuator 41 and to the first side 68 of the valve plate 35. It should be noted that the particular means for transmitting the motion of the valve plate 35 to the steering mechanism 31, can be of any type chosen with sound engineering judgement. Two embodiments are disclosed herein. In FIG. 3, the steering mechanism 31 includes a steering gear 70 that is operatively connected to the valve plate 35 and a first linkage 71 that is operatively connected to the first and second wheels 15, 16. When the first side 48 of the first vacuum actuator 40 (and therefore the first connector link 42) is forced in first direction 17, the valve plate 35 pivots about a pivot point 29 in a clockwise direction as seen in FIG. 3 and simultaneously rotates the steering gear 70 in a counterclockwise direction as seen in FIG. 3. This motion forces the first linkage 71 to transmit a first turning force to the first and second wheels 15, 16 in a manner currently known in the art. When the first side 49 of the second vacuum actuator 41 (and therefore the second connector link 43) is forced in a first direction 19, the valve plate 35 pivots about the pivot point 29 in a counterclockwise direction as seen in FIG. 3 and simultaneously rotates the steering gear 70 in a clockwise direction as seen in FIG. 3. This motion forces the first linkage 71 to transmit a second turning force to the first and second wheels 15, 16 in a manner currently known in the art.

With reference now to FIG. 4, the steering mechanism 31 of this embodiment includes a first member 72 that is operatively connected to the second wheel 16 and a second member 73 that is operatively connected to the first wheel 15. Both the first and second members 72, 73 are pivotably connected to the valve plate 35 by means of a pivot shaft 74. When the first connector link 42 is forced in first direction 17, the valve plate 35 about the steering rod 32 pivots in a counterclockwise direction as shown in FIG. 4. This forces the second member 73 to move toward the first wheel 15 thereby transmitting a first turning force to the first and second wheels 15, 16 in a manner currently known in the art. Similarly, when the second connector link 43 is forced in first direction 19, the valve plate 35 pivots about the steering rod 32 in a clockwise direction as shown in FIG. 4. This motion forces the first member 72 to move toward the second wheel 16 and therefore to transmit a second turning force to first and second wheels 15, 16 in a manner currently known in the art.

Figure 7:
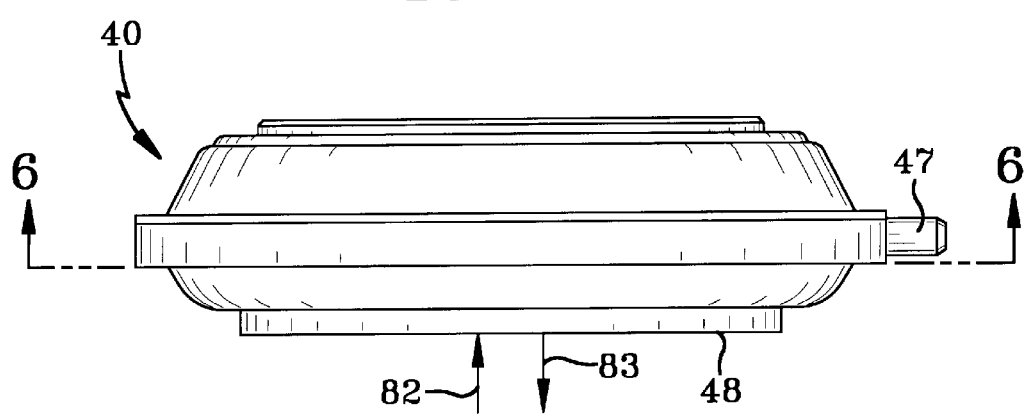
FIG. 7 is a side view of the vacuum actuator of FIG. 5 taken along the line 7—7 of FIG. 5 showing that a first side can be moved.

With continuing reference FIGS. 1–4, the operation of the power assist steering system 30 will first be described when the first and second switching means 52, 53 includes the first and second air valves 38, 39. When the operator desires to turn the riding mower 10 in first direction 78 as seen in FIG. 3, he adjusts the steering implement 21 in a manner commonly known in the art. This motion causes the trigger segment 34 to rotate in a counter clockwise direction as seen in FIG. 4. The first end 65 of the extension 33 contacts and presses the tip 27 of the first air valve 38 thereby closing the first air valve 38. This cuts off the first vacuum actuator 40 from the vacuum means 24. When the first air valve 38 is closed, air is drawn through the holes 84 in the first air valve 38, on through the first vacuum line 45 and into the first vacuum actuator 40 thereby removing the vacuum from the first vacuum actuator 40. This forces the first side 48 of the first vacuum actuator 40 as well as the first connector link 42 to move in first direction 17. It should be noted that this first direction 17 corresponds to outward direction 83 as shown in FIG. 7. This motion of the first connector link 42 forces the valve plate 35 to also rotate in a counterclockwise direction as seen in FIG. 4. The rotation of the valve plate 35 is then transmitted to the steering mechanism 31 and then to the first and second wheels 15, 16 as described above.

With continuing reference to FIGS. 1–4, should the operator then desire to turn the riding mower 10 in the second direction 79 as shown in FIG. 3 the steering implement 21 would be adjusted in a manner commonly known in the art thereby forcing the trigger segment 34 to rotate in a clockwise direction as seen in FIG. 4. Such a clockwise rotation of the trigger segment 34 would first cause the first end 65 of the extension 33 to move away from the tip 27 of the first air valve 38 thereby opening the first air valve 38. This recommunicates the first vacuum actuator 40 with the vacuum means 24 and re-establishes a vacuum within the first vacuum actuator 40. This forces the first side 48 of the first vacuum actuator 40 as well as the first connector link 42 to move in a second direction 18 that corresponds to inward direction 82 as shown in FIG. 7. The valve plate 35 would correspondingly begin to move in a clockwise direction as seen in FIG. 4. As the trigger segment 34 is forced further in a clockwise direction, as seen in FIG. 4, the second end 66 of the extension 33 contacts and presses the tip 28 of the second air valve 39 thereby closing the second air valve 39.

This cuts off the second vacuum actuator 41 from the vacuum means 24. When the second air valve 39 is closed, air is drawn through the holes 85 in the second air valve 39, on through the second vacuum line 46 and into the second vacuum actuator 41 thereby removing the vacuum from the second vacuum actuator 41. This forces the first side 49 of the second vacuum actuator 41 as well as the second connector link 43 to move in first direction 19. This motion of the second connector link 43 forces the valve plate 35 to rotate in a clockwise direction as seen in FIG. 4. The rotation of the valve plate 35 is then transmitted to the steering mechanism 31 and then to the first and second wheels 15, 16 as described above.

With reference now to FIGS. 1–4 and 8, the operation of the power assist steering system 30 when the first and second switching means 52, 53 include the first and second electric switches 54, 55 is similar to that just described. When the first electric switch 54 is closed by the first end 65 of the extension 33, the first solenoid valve 56 is closed as described above. When the first solenoid valve 56 is closed ambient air is drawn through the holes 62 in the first solenoid valve 52, on through the first vacuum line 45 and into the first vacuum actuator 40 thereby removing the vacuum from the first vacuum actuator 40. This forces the first side 48 of the first vacuum actuator 40 as well as the first connector link 42 to move in first direction 17. The transmittal of this force to the first and second wheels 15, 16 is the same as describe above. When the second electric switch 55 is closed the second solenoid valve 57 is closed as described above. When the second solenoid valve 57 is closed ambient air is drawn through the holes 63 in the second solenoid valve 57 on through the second vacuum line 46 and into the second vacuum actuator 41 thereby removing the vacuum from the second vacuum actuator 41. This forces the second side 49 of the second vacuum actuator 41 as well as the second connector link 43 to move in first direction 19. The transmittal of this force onto the first and second wheels 15, 16 is similar to that described above.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A power assist steering system for use on a riding mower, the riding mower having an engine with an intake manifold, a steering implement and a steering mechanism operatively connected to a first wheel, said power assist steering system comprising:

(1) first and second vacuum actuators each having
  (a) a connection port and
  (b) a first side, said first side of said first vacuum actuator moving inwardly with respect to said first vacuum actuator as a vacuum is established inside said first vacuum actuator and moving outwardly with respect to said first vacuum actuator as the vacuum is removed from inside said first vacuum actuator, said first side of said second vacuum actuator moving inwardly with respect to said second vacuum actuator as a vacuum is established inside said second vacuum actuator and moving outwardly with respect to said second vacuum actuator as the vacuum is removed from inside said second vacuum actuator;

(2) vacuum means for providing a vacuum to said first and second vacuum actuators, the intake manifold providing said vacuum means;

(3) activating means for selectively activating said first and second vacuum actuators, said activating means having (a) first and second switching means, said first switching means selectively initiating said first vacuum actuator, said second switching means selectively initiating said second vacuum actuator, (b) a vacuum source line, said vacuum source line communicating a vacuum from the intake manifold to said first and second switching means, (c) first and second vacuum lines, said first vacuum line communicating a vacuum from said first switching means to said first vacuum actuator, said second vacuum line communicating a vacuum from said second switching means to said second vacuum actuator, (d) a trigger segment having an extension with first and second ends, said trigger segment being selectively rotatable by the steering implement, said first end of said extension for selectively switching said first switching means, said second end of said extension for selectively switching said second switching means; and, (4) power assist means for assisting the steering mechanism, said power assist means having (a) a first connector link for use in turning the first wheel in a first direction, said first connector link being operatively connected to said first side of said first vacuum actuator, (b) a second connector link for use in turning the first wheel in a second direction, said second connector link being operatively connected to said first side of said second vacuum actuator, (c) a valve plate having first and second sides for supporting said first and second switching means, said valve plate being operatively connected to the steering mechanism, said valve plate having first and second stop bars for operative connection with said first and second ends of said extension of said trigger segment, said first connector link being pivotably connected to said first side of said valve plate, said second connector link being pivotably connected to said second side of said valve plate.

2. A power assist steering system for use on a vehicle, the vehicle having a steering implement and a steering mechanism operatively connected to a first wheel, said power assist steering system comprising:

a first vacuum actuator;

vacuum means for providing a vacuum to said first vacuum actuator;

activating means for selectively activating said first vacuum actuator, said activating means including first switching means, said first switching means selectively initiating said first vacuum actuator, said activating means also including a trigger segment, said trigger segment being operatively connected to the steering implement, said trigger segment selectively switching said first switching means; and, power assist means for assisting the steering mechanism in turning the first wheel, said power assist means being operatively connected to said first vacuum actuator, said power assist means including a valve plate for supporting said first switching means, said valve plate being operatively connected to said trigger segment and the steering mechanism.

3. The power assist steering system of claim 2 wherein the vehicle has an engine with an intake manifold, said intake manifold providing said vacuum means.

4. The power assist steering system of claim 2 wherein said first switching means comprises:

a first air valve.

5. The power assist steering system of claim 2 wherein said first switching means comprises:

a first electric switch.

6. The power assist steering system of claim 2 wherein said trigger segment comprises:

an extension with first and second ends, said first end of said extension for selectively switching said first switching means.

7. A power assist steering system for use on a vehicle, the vehicle having a steering implement and a steering mechanism operatively connected to a first wheel, said power assist steering system comprising:

first and second vacuum actuators;

vacuum means for providing a vacuum to said first and second vacuum actuators;

activating means for selectively activating said first and second vacuum actuators, said activating means including first and second switching means and a trigger segment that is operatively connected to the steering implement, said first switching means selectively initiating said first vacuum actuator said second switching means selectively initiating said second vacuum actuator, said trigger segment selectively switching said first and second switching means, said trigger segment including an extension with first and second ends, said first end of said extension for selectively switching said first switching means, said second end of said extension for selectively switching said second switching means; and, power assist means for assisting the steering mechanism in turning the first wheel, said first vacuum actuator for use with said power assist means in turning the first wheel in a first direction, said second vacuum actuator for use with said power assist means in turning the first wheel in a second direction, said power assist means including a valve plate for supporting said first and second switching means, said valve plate being operatively connected to the steering mechanism, said valve plate having first and second stop bars for operative connection with said first and second ends of said extension of said trigger segment.

8. The power assist steering system of claim 7 wherein said first and second switching means comprise:

first and second air valves.

9. The power assist steering system of claim 7 wherein said first and second switching means comprise:

first and second electric switches.

* * * * *